United States Patent
Boshev et al.

(10) Patent No.: US 10,275,346 B2
(45) Date of Patent: Apr. 30, 2019

(54) AUTOMATIC TESTING OF DISASTER RECOVERY SCENARIOS IN CLOUD ENVIRONMENTS

(71) Applicant: SAP SE, Walldorf (DE)

(72) Inventors: Stoyan Boshev, Sofia (BG); Mincho Velev, Stara Zagora (BG)

(73) Assignee: SAP SE, Walldorf (DE)

( * ) Notice: Subject to any disclaimer, the term of this patent is extended or adjusted under 35 U.S.C. 154(b) by 144 days.

(21) Appl. No.: 15/372,837

(22) Filed: Dec. 8, 2016

(65) Prior Publication Data

US 2018/0165185 A1 Jun. 14, 2018

(51) Int. Cl.
*G06F 11/36* (2006.01)
*G06F 11/07* (2006.01)

(52) U.S. Cl.
CPC ...... *G06F 11/3692* (2013.01); *G06F 11/0793* (2013.01); *G06F 11/3664* (2013.01); *G06F 11/3684* (2013.01); *G06F 11/3688* (2013.01)

(58) Field of Classification Search
CPC ............ G06F 11/3692; G06F 11/3688; G06F 11/3684; G06F 11/3664; G06F 11/079; G06F 11/0724; G06F 11/0766; G06F 11/2069; G06F 11/202; G06F 11/203
See application file for complete search history.

(56) References Cited

U.S. PATENT DOCUMENTS

| | | | |
|---|---|---|---|
| 7,653,828 B2 | 1/2010 | Kostadinov et al. | |
| 7,689,600 B2 | 3/2010 | Semerdzhiev et al. | |
| 8,201,189 B2 | 6/2012 | Semerdzhiev et al. | |
| 8,321,688 B2 * | 11/2012 | Auradkar | G06F 11/1464 380/44 |
| 8,977,598 B2 * | 3/2015 | Montulli | G06F 17/30129 707/679 |
| 9,141,625 B1 * | 9/2015 | Thornewell | G06F 17/30079 |
| 9,268,797 B2 * | 2/2016 | Whitehead | G06F 17/30289 |
| 9,274,783 B2 | 3/2016 | Valkov et al. | |
| 9,432,398 B2 | 8/2016 | Iliev | |
| 2014/0007239 A1 | 1/2014 | Sharpe | |
| 2014/0181040 A1 * | 6/2014 | Montulli | G06F 11/1451 707/652 |
| 2015/0365476 A1 | 12/2015 | Genevski et al. | |
| 2016/0294850 A1 | 10/2016 | Iliev et al. | |
| 2016/0306719 A1 * | 10/2016 | Laicher | G06F 11/203 |
| 2017/0308446 A1 * | 10/2017 | Kanso | G06F 11/202 |

OTHER PUBLICATIONS

U.S. Appl. No. 14/961,115, filed Dec. 7, 2015, Stoyan Boshev.

* cited by examiner

*Primary Examiner* — Nadeem Iqbal
(74) *Attorney, Agent, or Firm* — Fish & Richardson P.C.

(57) ABSTRACT

A test application running on a first platform in a first data center is configured for disaster recovery. A first request is sent to the test application, including determining that the first request is processed by a first test application instance in the first data center. A second request is sent to the test application to generate test data. A third request is sent to a second platform in a second data center to switch traffic for the test application from the first instance to a second instance running in the second data center. A fourth request is sent to the test application, including determining that the fourth request is processed by the second instance. A fifth request is sent to the test application to validate data replicated from the first data center to the second data center. A determination is made as to whether disaster recovery is successful.

17 Claims, 4 Drawing Sheets

AUTOMATIC TESTING OF DISASTER RECOVERY SCENARIOS IN CLOUD ENVIRONMENTS

BACKGROUND

A Platform as a Service (PaaS) model can be used for cloud application development. A cloud provider can provide, to an application developer, hardware and software tools used for application development, using infrastructure located at or associated with the cloud provider. The application developer, as a user of PaaS, can use the infrastructure provided by the cloud provider rather than invest in purchasing and building such infrastructure on premise at the application developer.

SUMMARY

The present disclosure describes methods and systems, including computer-implemented methods, computer program products, and computer systems for automatic testing of disaster recovery scenarios in cloud environments.

In an implementation, a test application running on a first platform in a first data center is configured for disaster recovery. A first request is sent to the test application, including determining that the first request is processed by a first test application instance in the first data center. A second request is sent to the test application to generate test data. A third request is sent to a second platform in a second data center to switch traffic for the test application from the first instance to a second instance running in the second data center. A fourth request is sent to the test application, including determining that the fourth request is processed by the second instance. A fifth request is sent to the test application to validate data replicated from the first data center to the second data center. A determination is made as to whether disaster recovery is successful.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, an automated disaster recovery test for a cloud environment can be performed at a higher frequency than a manual test while using the same or less resources as required for the running of the manual test. Second, once configured, an automated disaster recovery test for a cloud environment can be performed multiple times, on different occasions. Third, an automated disaster recovery test for a cloud environment can include more robust testing conditions than a manual test. Regular, periodic testing can result in discovery of a problem with a platform service or component within a testing time period. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description describes automatic testing of disaster recovery scenarios in cloud environments and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

Disaster recovery (DR) solutions for cloud environments can be complex and can have dependencies on a number of other systems and services. Manual tests can be performed to validate that a disaster recovery scenario is successful across systems and services. A manual test can be time consuming and may not test all possible systems and services in the cloud environment. When manual tests are used by an organization, the organization may schedule them occasionally, such as once per year, due to resources required to configure and perform the manual tests. An organization can perform automated end-to-end tests, rather than manual tests, for testing disaster recovery solutions for a cloud environment. Automated tests can be run more frequently than manual tests, due to a requirement of less organizational resources for the automated tests. The automated tests can include testing that can be more exhaustive and robust than manually-performed tests.

Figure 1:
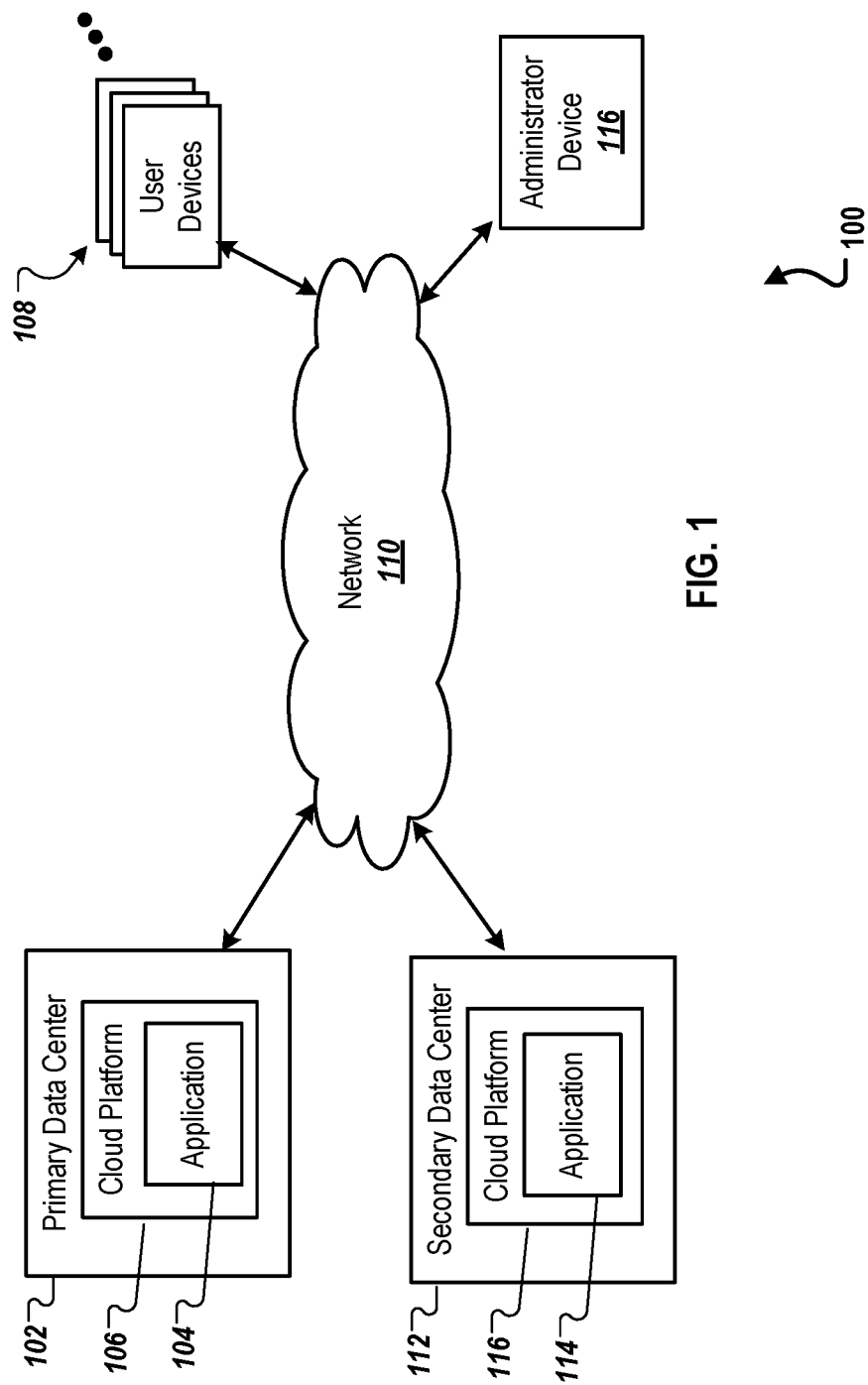
FIGS. 1 and 2 are block diagrams illustrating example systems for automatic testing of disaster recovery scenarios in cloud environments, according to an implementation.

FIG. 1 is a block diagram illustrating an example system 100 for automatic testing of disaster recovery scenarios in cloud environments, according to an implementation. A primary data center 102 makes an application 104 running on a cloud platform 106 available to user devices 108 over a network 110. User devices 108 can submit requests to the application 104 using a Uniform Resource Locator (URL) associated with the application 104. A secondary data center 112 can provide backup functionality for the primary data center 102. If a disaster strikes the primary data center 102, application requests sent to the URL associated with the application 104 can be re-routed to an application instance 114 running on a cloud platform 116 in the secondary data center 112. Data associated with the application 104 can be replicated to the secondary data center 112, for use by the application 114 in the event of a failover.

The transitioning to the secondary data center 112 can be referred to as a disaster recovery (DR) scenario. An administrator can periodically perform a manual DR scenario test for the application 104, such as by making one or more configurations and requests using an administrator device 116. As described in more detail below, an automated DR scenario test can be automatically performed generally at a higher frequency than a manual test, can more robustly test the DR scenario, and can involve less administrator time as compared to manual testing.

Figure 2:
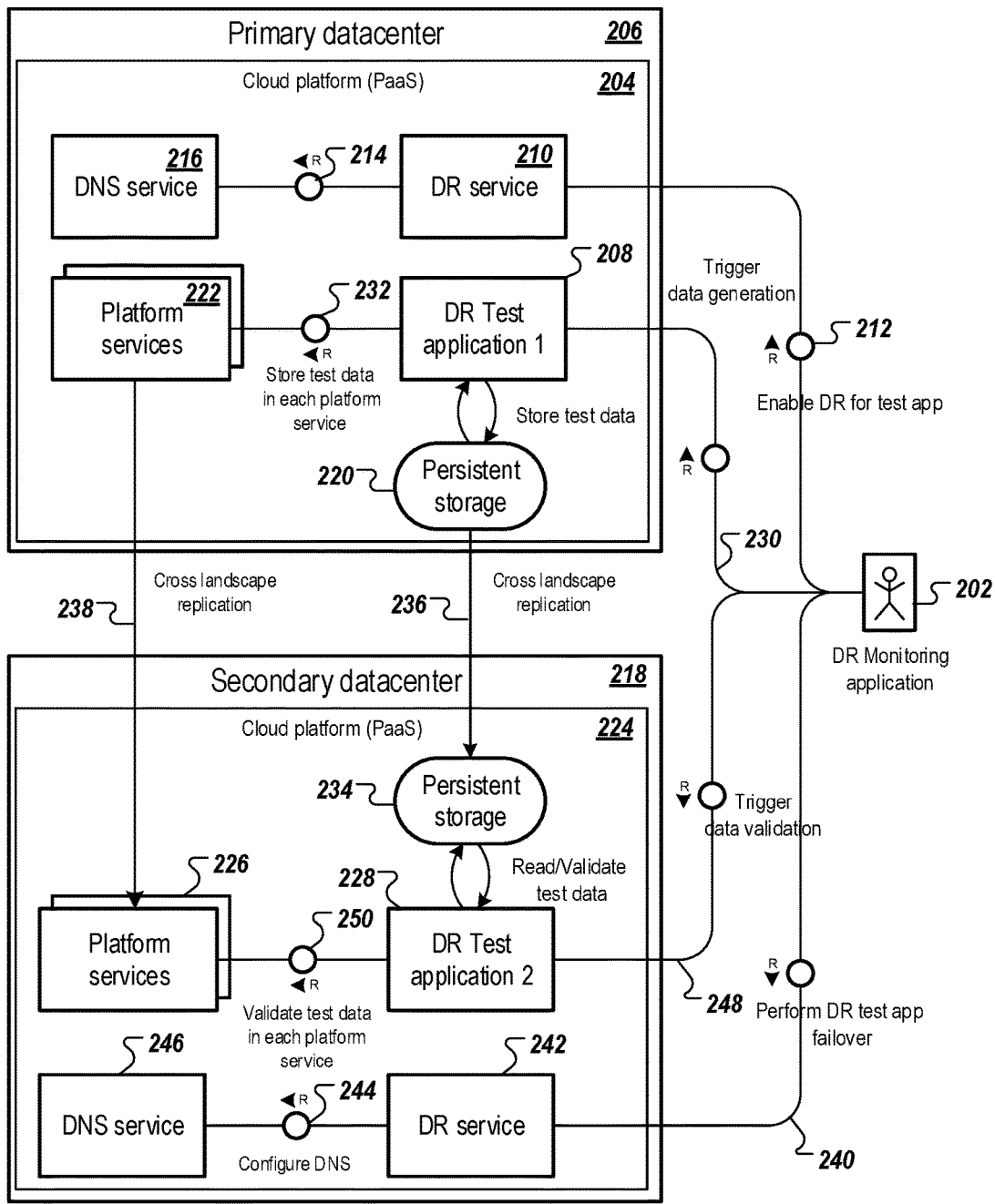

FIG. 2 is a block diagram illustrating an example system 200 for automatic testing of disaster recovery scenarios in cloud environments, according to an implementation. A DR monitoring application 202 can be used to monitor tests of one or more DR scenarios for a cloud platform 204 in a primary data center 206. The cloud platform 204 can provide Platform as a Service (PaaS) functionality and host applications on behalf of application developers.

The DR monitoring application 202 can run on a client device of an administrator, for example. As another example, the DR monitoring application 202 can be a background process running on server (in the primary data center 206 or in another location). The DR monitoring application 202 can execute DR relevant configurations and operations for a DR test application, as a driver for testing a DR scenario for the cloud platform 204 to determine whether services, network components, and configurations are working correctly in the cloud platform 204. The DR monitoring application 202 can perform a test automatically on a periodic basis, or can perform the test in response to a manual input from an administrator. The DR monitoring application 202 can provide a user interface in which a test can be initiated, automatic tests can be configured, or test results can be displayed.

A test application instance 208 can be installed in the cloud platform 204. The DR monitoring application 202 can invoke a DR service 210 running in the cloud platform 204 to enable disaster recovery for the test application instance 208. The DR service 210 can provide a Representational State Transfer (REST) Application Programming Interface (API) that can be used to administer DR processes in the primary data canter 206. The DR monitoring application 202 can use the API to send a request 212 to the DR service 210 to enable disaster recovery for the test application instance 208. The request 212, and other requests sent to the DR service 210, can include authorization information associated with a test or administrator account.

Enabling disaster recovery can include the DR service 210 sending a request 214 to a DNS service 216 to configure or add an entry (or verify the existence of an entry) associated with the test application instance 208 so that requests associated with a Uniform Resource Locator (URL) associated with the test application are routed to the primary data center 206. The DR monitoring application 202 can send a test request to the URL associated with the test application and analyze a response to the test request received from the test application instance 208 to verify that the test application instance 208 is serving requests for the test application.

The DR service 210 can enable disaster recovery for the test application instance 208 by enabling the replication of data associated with the test application instance 208 from the primary data center 206 to a secondary data center 218. The test application instance 208 can be configured to store application data in persistent storage 220 and to request storage of application data in association with one or more platform services 222 running in the cloud platform 204. The persistent storage 220 can be a database, one or more files, one or more network volumes, or some other type of persistent storage. The platform services 222 can be used by the test application instance 208 to store other persistent data, which can be stored by the platform services 222 in the same or different persistent storage than the persistent storage 220.

Enabling replication can include configuring the cloud platform 204 to replicate the data associated with the test application instance that is stored in the persistent storage 220 or stored by the platform services 222 to the secondary data center 218. The secondary data center 218 can include similar components to the primary data center 206. A cloud platform 224 can execute platform services 226 and a second test application instance 228. The second test application instance 228 can be installed in the secondary data center 218 before or as part of enabling disaster recovery for the test application instance 208.

The DR monitoring application 202 can send a request 230 to the test application instance 208 to trigger execution of a data generation procedure for the test application. In some implementations, the request 230 indicates a size and/or type of data to generate. The test application instance 208 can be configured to store, in response to the request 230, a first set of application data in the persistent storage 220 and a second set of application data in the platform services 222 (using one or more requests 232 sent to the platform services 222). Application data can include files, parameters, configuration data, security artifacts, database data, or other types of application data.

As mentioned, the cloud platform 204 can be configured to automatically replicate data from the cloud platform 204 in the primary data center 206 to the cloud platform 224 in the secondary data center 218. Data from the persistent storage 220 can be automatically replicated to corresponding persistent storage 234 in the cloud platform 224, as illustrated by a cross data center replication data flow 236. Data stored by the platform services 222 can be automatically replicated to corresponding platform services 226 in the cloud platform 224, as illustrated by a cross data center replication data flow 238.

The DR monitoring application 202 can be configured to wait a predetermined amount of time after sending the request 230, to allow for replication to occur. After the predetermined amount of time has elapsed, the DR monitoring application 202 can simulate a disaster occurrence by sending a request 240 to a DR service 242 running in the cloud platform 224 for performing a failover procedure for the test application. The DR service 242 can perform the failover by sending a request 244 to a DNS service 246 to perform a traffic switch that will route traffic for the test application so that it is received by the second test application instance 228 rather than the test application instance 208. The request 244 can be to configure a DNS entry in the DNS service 246 so that requests sent to a URL for the test application are routed to the cloud platform 224 for execution by the second test application instance 228. The DR monitoring application 202 can be configured to send a test message to the test application that includes the URL and analyze a response to the test message to verify that the test message was processed by the second test application instance 228 in the secondary data center 218.

The DR monitoring application 202 can send a request 248 to the second test application instance 228 to perform a data validation procedure. The data validation procedure can include instructions to retrieve application data from the persistent storage 234 that is associated with the second test application instance 228. The DR test application 228 can be configured to compare the retrieved data to data that was generated by the test application instance 208 in response to the data generation request 230 to determine whether the retrieved data matches the generated data. The data validation request 248 can include a copy or description of the generated data or the second test application instance 228 can otherwise have access to the generated data.

The data validation procedure can include instructions to send one or more requests 250 to the platform services 226 to retrieve data received by the platform services 226 in the cross data center replication data flow 238. The DR test application 228 can be configured to compare the data retrieved from the platform services 226 to data previously stored by the platform services 222. The data validation request 248 can include a copy or description of the stored data or the second test application instance 228 can otherwise have access to the stored data.

The second test application instance 228 can be configured to determine a validation result based on the comparisons of generated/retrieved persistent data and stored/retrieved platform services data. The validation result can indicate whether the disaster recovery scenario succeeded or failed. If retrieved data matches data that was replicated, the validation result can indicate a successful test. If retrieved data does not match replicated data, or if some other error occurred during execution of the DR monitoring application 202 (such as non-responsiveness of the test application instance 208, the DR service 210, the second test application instance 228, or the DR service 242), the validation result can indicate a failed test. The validation result can be returned to the DR monitoring application 202 in a response to the data validation request 248, for display in the DR monitoring application 202 and/or for storage as a disaster recovery scenario test result.

An administrator can review disaster recovery scenario test results, and can take action if errors are reported. A configuration change may be performed in the primary data center 206 and/or the secondary data center 218, for example. The administrator can also configure an automatic test interval based on review of disaster recovery scenario test results, such as to shorten or lengthen an interval between automatic executions of the disaster recovery scenario test.

Figure 3:
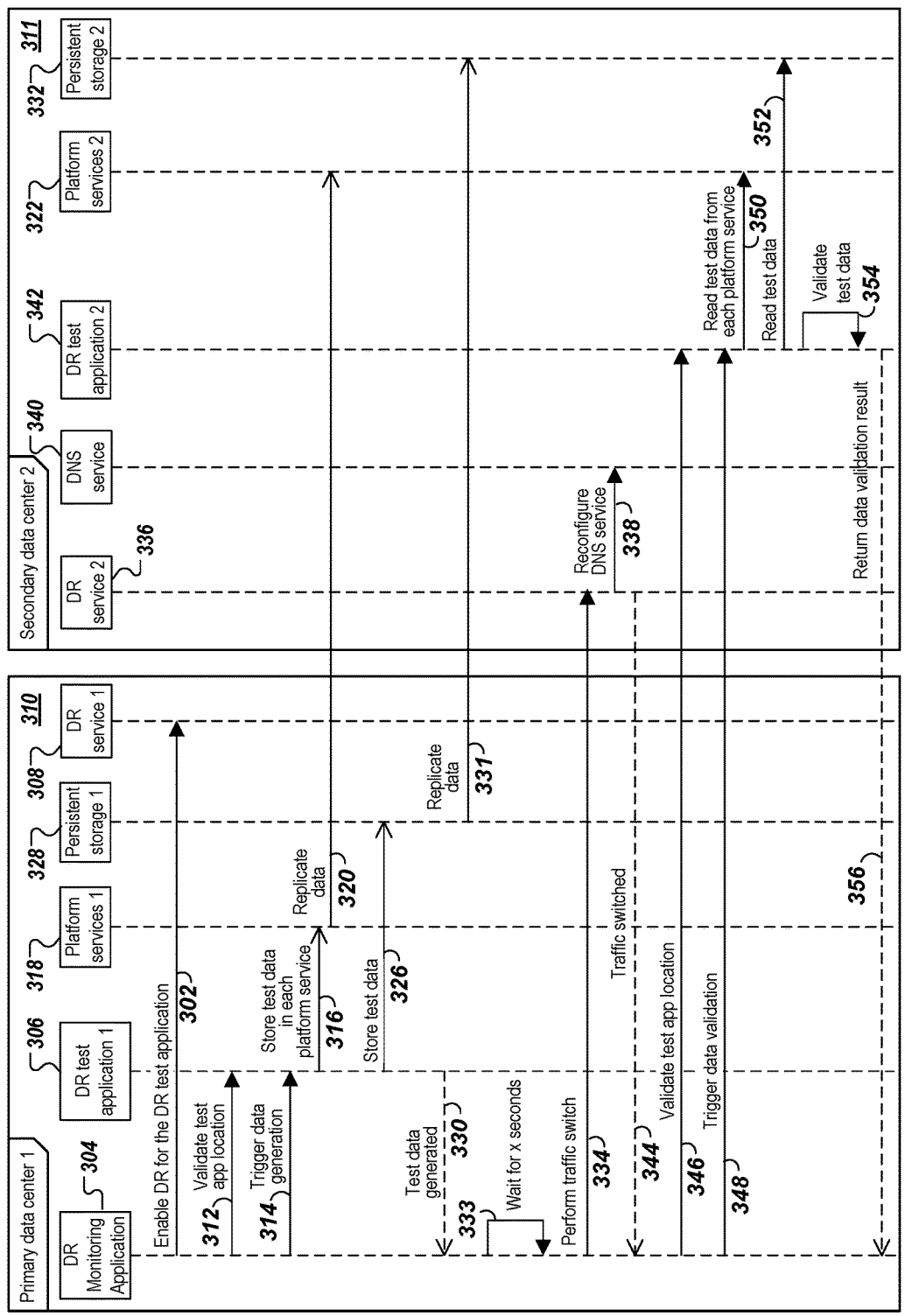
FIG. 3 is a swim lane diagram illustrating an example method for automatic testing of disaster recovery scenarios in cloud environments, according to an implementation.

FIG. 3 is a swim lane diagram illustrating an example method 300 for automatic testing of disaster recovery scenarios in cloud environments, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware as appropriate. In some implementations, various steps of method 300 can be run in parallel, in combination, in loops, or in any order.

At 302, a DR monitoring application 304 enables disaster recovery for a DR test application 306 in a DR service 308 in a first data center 310. The DR monitoring application 304 can execute inside the first data center 310, as shown, or can execute outside the first data center 310. Enabling disaster recovery can include enabling replication of data associated with the test cloud application 306 from the first data center 310 to a second data center 311. The first data center 310 can be a primary data center and the second data center 311 can be a secondary data center. From 304, method 300 proceeds to 312.

At 312, the DR monitoring application 304 validates a location of the DR test application 306. For example, the DR monitoring application 304 can send a test request to the DR test application 306 and can analyze a response received from the test application 306 to validate that the request is associated with the first data center 310. From 312, method 300 proceeds to 314.

At 314, the DR monitoring application 304 triggers data generation for the DR test application 306. For example, the DR monitoring application 304 can invoke a data generation procedure in the DR test application 306. From 314, method 300 proceeds to 316.

At 316, in response to the data generation trigger, the DR test application 306 stores test data for each of one or more platform services 318 running in the first data center 310. From 316, method 300 proceeds to 320.

At 320, the platform services 318 replicate data to corresponding platform services 322 running in the second data center 311. From 320, method 300 proceeds to 326.

At 326, in response to the data generation trigger, the DR test application 306 stores test data in persistent storage 328. From 326, method 300 proceeds to 330.

At 330, the DR test application 306 sends a confirmation of test data generation to the DR monitoring application 304. From 330, method 300 proceeds to 331.

At 331, data is replicated from the persistent storage 328 to persistent storage 332 of the second data center 311. Replication can occur automatically based on the previous enablement of disaster recovery. From 331, method 300 proceeds to 333.

At 333, the DR monitoring application 304 waits a predetermined number of seconds to allow replication to complete. From 333, method 300 proceeds to 334.

At 334, the DR monitoring application 304 sends a request to a DR service 336 running in the second data center 311 to switch traffic for the DR test application 306 to the second data center 311. From 334, method 300 proceeds to 338.

At 338, the DR service 336 reconfigures a DNS service 340 to route traffic targeted for the DR test application 306 to go to a DR test application 342 running in the second data center 311. From 338, method 300 proceeds to 344.

At 344, the DR service 336 sends a confirmation of the traffic switch to the DR monitoring application 304. From 344, method 300 proceeds to 346.

At 346, the DR monitoring application 304 validates a location of the DR test application 342. For example, the DR monitoring application 304 can send a test request to the DR test application 342 and can analyze a response received from the test application 342 to validate that the request is associated with the second data center 311. From 346, method 300 proceeds to 348.

At 348, the DR monitoring application 304 triggers data validation for the DR test application 342. From 348, method 300 proceeds to 350.

At 350, in response to the data validation trigger, the DR test application 342 reads test data from each platform service 322 running in the second data center 311. From 350, method 300 proceeds to 352.

At 352, the DR test application 342 reads test data from the persistent storage 332. From 352, method 300 proceeds to 354.

At 354, the DR test application 342 validates the test data read from the platform services 322 and the persistent storage 332. For example, the DR test application can determine whether the test data read from the platform services 322 matches test data stored at 316 and whether the test data read from the persistent storage 332 matches test data stored at 326. From 354, method 300 proceeds to 356.

At 356, the DR test application 342 returns a data validation result to the DR monitoring application 304. The data validation result can indicate whether the disaster recovery scenario is successful. From 356, method 300 stops.

Figure 4:
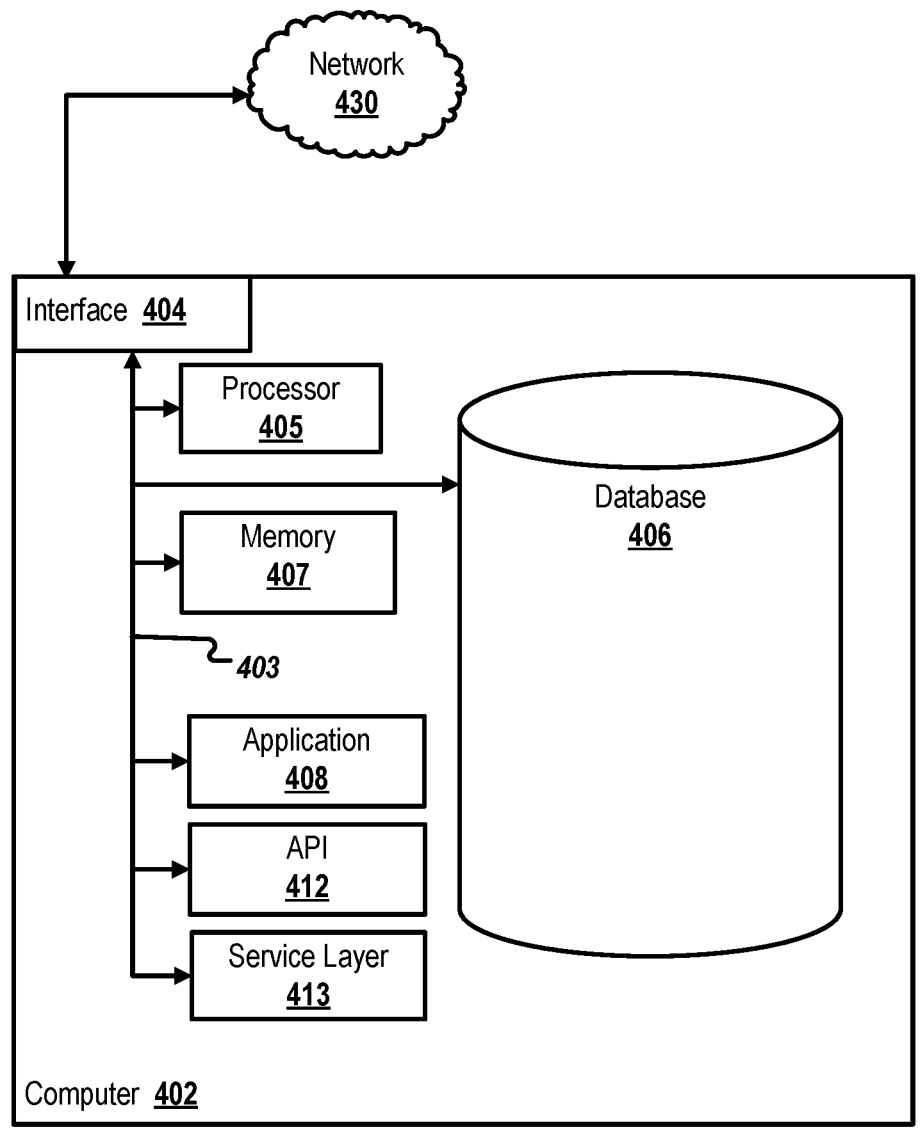
FIG. 4 is a block diagram illustrating an exemplary computer system used to provide computational functionalities associated with described algorithms, methods, functions, processes, flows, and procedures as described in the instant disclosure, according to an implementation.

FIG. 4 is a block diagram of an exemplary computer system 400 used to provide computational functionalities associated with described algorithms, methods, functions, processes, flows, and procedures as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402.

The computer 402 also includes a memory 407 that can hold data for the computer 402 or other components (or a combination of both) that can be connected to the network 430 (whether illustrated or not). For example, memory 407 can be random access memory (RAM), read-only memory (ROM), optical, magnetic, and the like storing data consistent with this disclosure. In some implementations, memory 407 can be a combination of two or more different types of memory (for example, a combination of RAM and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, applications, etc. Further, although illustrated as a single application 408, the application 408 may be implemented as multiple applications on the computer 402. In addition, although illustrated as integral to the computer 402, in alternative implementations, the application 408 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method includes: configuring a test cloud application running on a first cloud platform in a first data center for disaster recovery; sending a first request to the test cloud application including determining that the first request is processed by a first instance of the test cloud application in the first data center; sending a second request to the test cloud application to generate data associated with the test cloud application; sending a third request to a second cloud platform in a second data center to switch application traffic for the test cloud application from the first instance to a second instance of the test cloud application running on the second cloud platform in the second data center; sending a fourth request to the test cloud application including determining that the fourth request is processed by the second instance in the second data center; sending a fifth request to the test cloud application to validate data replicated from the first data center to the second data center; and determining whether disaster recovery is successful for the test cloud application based on a response received to the fifth request.

The foregoing and other described implementations can each optionally include one or more of the following features:

A first feature, combinable with any of the following features, wherein configuring the test cloud application for data recovery includes enabling replication of data associated with the test cloud application from the first data center to the second data center.

A second feature, combinable with any of the previous or following features, wherein the generated data includes persistent data stored by the first instance of the test application in the first data center and data stored in association with one or more cloud services running in the first cloud platform.

A third feature, combinable with any of the previous or following features, wherein the response received to the fifth request includes information indicating whether the generated data matches data retrieved by the second instance of the test application from the second data center.

A fourth feature, combinable with any of the previous or following features, wherein the application traffic is switched using a Domain Name Service (DNS) system.

A fifth feature, combinable with any of the previous or following features, wherein the test cloud application is associated with a disaster recovery service.

A sixth feature, combinable with any of the previous or following features, wherein the configuring, the sending of the first, second, third, fourth, and fifth requests, and the determining whether disaster recovery is successful are automatically performed on a periodic basis.

In a second implementation, a non-transitory, computer-readable medium stores one or more instructions executable by a computer system to perform operations comprising: configuring a test cloud application running on a first cloud platform in a first data center for disaster recovery; sending a first request to the test cloud application including determining that the first request is processed by a first instance of the test cloud application in the first data center; sending a second request to the test cloud application to generate data associated with the test cloud application; sending a third request to a second cloud platform in a second data center to switch application traffic for the test cloud application from the first instance to a second instance of the test cloud application running on the second cloud platform in the second data center; sending a fourth request to the test cloud application including determining that the fourth request is processed by the second instance in the second data center; sending a fifth request to the test cloud application to validate data replicated from the first data center to the second data center; and determining whether disaster recovery is successful for the test cloud application based on a response received to the fifth request.

The foregoing and other described implementations can each optionally include one or more of the following features:

A first feature, combinable with any of the following features, wherein configuring the test cloud application for data recovery includes enabling replication of data associated with the test cloud application from the first data center to the second data center.

A second feature, combinable with any of the previous or following features, wherein the generated data includes persistent data stored by the first instance of the test application in the first data center and data stored in association with one or more cloud services running in the first cloud platform.

A third feature, combinable with any of the previous or following features, wherein the response received to the fifth request includes information indicating whether the generated data matches data retrieved by the second instance of the test application from the second data center.

A fourth feature, combinable with any of the previous or following features, wherein the application traffic is switched using a Domain Name Service (DNS) system.

A fifth feature, combinable with any of the previous or following features, wherein the test cloud application is associated with a disaster recovery service.

A sixth feature, combinable with any of the previous or following features, wherein the configuring, the sending of the first, second, third, fourth, and fifth requests, and the determining whether disaster recovery is successful are automatically performed on a periodic basis.

In a third implementation, a computer-implemented system comprises a computer memory and a hardware processor. The hardware processor is interoperably coupled with the computer memory and configured to perform operations comprising: configuring a test cloud application running on a first cloud platform in a first data center for disaster recovery; sending a first request to the test cloud application including determining that the first request is processed by a first instance of the test cloud application in the first data center; sending a second request to the test cloud application to generate data associated with the test cloud application; sending a third request to a second cloud platform in a second data center to switch application traffic for the test cloud application from the first instance to a second instance of the test cloud application running on the second cloud platform in the second data center; sending a fourth request to the test cloud application including determining that the fourth request is processed by the second instance in the second data center; sending a fifth request to the test cloud application to validate data replicated from the first data center to the second data center; and determining whether disaster recovery is successful for the test cloud application based on a response received to the fifth request The foregoing and other described implementations can each optionally include one or more of the following features:

A first feature, combinable with any of the following features, wherein configuring the test cloud application for data recovery includes enabling replication of data associated with the test cloud application from the first data center to the second data center.

A second feature, combinable with any of the previous or following features, wherein the generated data includes persistent data stored by the first instance of the test application in the first data center and data stored in association with one or more cloud services running in the first cloud platform.

A third feature, combinable with any of the previous or following features, wherein the response received to the fifth request includes information indicating whether the generated data matches data retrieved by the second instance of the test application from the second data center.

A fourth feature, combinable with any of the previous or following features, wherein the application traffic is switched using a Domain Name Service (DNS) system.

A fifth feature, combinable with any of the previous or following features, wherein the test cloud application is associated with a disaster recovery service.

A sixth feature, combinable with any of the previous or following features, wherein the configuring, the sending of the first, second, third, fourth, and fifth requests, and the determining whether disaster recovery is successful are automatically performed on a periodic basis.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    configuring a test cloud application for disaster recovery;
    sending a first request to the test cloud application including determining that the first request is processed by a first instance of the test cloud application in the first data center;
    sending a second request to the test cloud application to generate data associated with the test cloud application;
    sending a third request to a second cloud platform in a second data center to switch application traffic for the test cloud application from the first instance to a second instance of the test cloud application running on the second cloud platform in the second data center;
    sending a fourth request to the test cloud application including determining that the fourth request is processed by the second instance in the second data center;
    sending a fifth request to the test cloud application to validate data replicated from the first data center to the second data center, the fifth request including the generated data and instructing the second instance to retrieve data for the test cloud application from the second data center and compare the retrieved data to the generated data; and
    determining whether disaster recovery is successful for the test cloud application based on a response received to the fifth request, wherein the response indicates whether the generated data matches the retrieved data.

2. The computer-implemented method of claim 1, wherein configuring the test cloud application for data recovery includes enabling replication of data associated with the test cloud application from the first data center to the second data center.

3. The computer-implemented method of claim 1, wherein the generated data includes persistent data stored by the first instance of the test application in the first data center and data stored in association with one or more cloud services running in the first cloud platform.

4. The computer-implemented method of claim 1, wherein the application traffic is switched using a Domain Name Service (DNS) system.

5. The computer-implemented method of claim 1, wherein the test cloud application is associated with a disaster recovery service.

6. The computer-implemented method of claim 1, wherein the configuring, the sending of the first, second, third, fourth, and fifth requests, and the determining whether disaster recovery is successful are automatically performed on a periodic basis.

7. A non-transitory, computer-readable medium storing one or more instructions executable by a computer system to perform operations comprising:
    configuring a test cloud application for disaster recovery;
    sending a first request to the test cloud application including determining that the first request is processed by a first instance of the test cloud application in the first data center;
    sending a second request to the test cloud application to generate data associated with the test cloud application;
    sending a third request to a second cloud platform in a second data center to switch application traffic for the test cloud application from the first instance to a second instance of the test cloud application running on the second cloud platform in the second data center;
    sending a fourth request to the test cloud application including determining that the fourth request is processed by the second instance in the second data center;
    sending a fifth request to the test cloud application to validate data replicated from the first data center to the second data center, the fifth request including the generated data and instructing the second instance to retrieve data for the test cloud application from the second data center and compare the retrieved data to the generated data; and
    determining whether disaster recovery is successful for the test cloud application based on a response received to the fifth request, wherein the response indicates whether the generated data matches the retrieved data.

8. The computer-readable medium of claim 7, wherein configuring the test cloud application for data recovery includes enabling replication of data associated with the test cloud application from the first data center to the second data center.

9. The computer-readable medium of claim 7, wherein the generated data includes persistent data stored by the first instance of the test application in the first data center and data stored in association with one or more cloud services running in the first cloud platform.

10. The computer-readable medium of claim 7, wherein the application traffic is switched using a Domain Name Service (DNS) system.

11. The computer-readable medium of claim 7, wherein the test cloud application is associated with a disaster recovery service.

12. The computer-readable medium of claim 7, wherein the configuring, the sending of the first, second, third, fourth, and fifth requests, and the determining whether disaster recovery is successful are automatically performed on a periodic basis.

13. A computer-implemented system, comprising:
a computer memory; and
a hardware processor interoperably coupled with the computer memory and configured to perform operations comprising:
configuring a test cloud application for disaster recovery;
sending a first request to the test cloud application including determining that the first request is processed by a first instance of the test cloud application in the first data center;
sending a second request to the test cloud application to generate data associated with the test cloud application;
sending a third request to a second cloud platform in a second data center to switch application traffic for the test cloud application from the first instance to a second instance of the test cloud application running on the second cloud platform in the second data center;
sending a fourth request to the test cloud application including determining that the fourth request is processed by the second instance in the second data center;
sending a fifth request to the test cloud application to validate data replicated from the first data center to the second data center, the fifth request including the generated data and instructing the second instance to retrieve data for the test cloud application from the second data center and compare the retrieved data to the generated data; and
determining whether disaster recovery is successful for the test cloud application based on a response received to the fifth request, wherein the response indicates whether the generated data matches the retrieved data.

14. The computer-implemented system of claim 13, wherein configuring the test cloud application for data recovery includes enabling replication of data associated with the test cloud application from the first data center to the second data center.

15. The computer-implemented system of claim 13, wherein the generated data includes persistent data stored by the first instance of the test application in the first data center and data stored in association with one or more cloud services running in the first cloud platform.

16. The computer-implemented system of claim 13, wherein the application traffic is switched using a Domain Name Service (DNS) system.

17. The computer-implemented system of claim 13, wherein the test cloud application is associated with a disaster recovery service.

* * * * *